United States Patent
Zhang et al.

(10) Patent No.: US 10,277,296 B2
(45) Date of Patent: Apr. 30, 2019

(54) METHOD AND APPARATUS FOR CHANNEL STATE INFORMATION (CSI) REPORTING IN A MASSIVE MIMO COMMUNICATIONS SYSTEM

(71) Applicant: Hong Kong Applied Science and Technology Research Institute Co., Ltd., Shatin, New Territories (HK)

(72) Inventors: Yuxian Zhang, Fanling (HK); Man Wai Kwan, Shatin (HK); Eric Kong Chau Tsang, Kowloon (HK)

(73) Assignee: HongKong Applied Science and Technology Research Institute Co., Ltd., Shatin, N.T. (HK)

( * ) Notice: Subject to any disclaimer, the term of this patent is extended or adjusted under 35 U.S.C. 154(b) by 86 days.

(21) Appl. No.: 15/434,115

(22) Filed: Feb. 16, 2017

(65) Prior Publication Data
US 2018/0234149 A1 Aug. 16, 2018

(51) Int. Cl.
*H04L 12/24* (2006.01)
*H04L 5/14* (2006.01)
(Continued)

(52) U.S. Cl.
CPC ......... *H04B 7/0617* (2013.01); *H04B 7/0413* (2013.01); *H04B 7/0626* (2013.01); *H04B 7/0632* (2013.01); *H04L 5/0048* (2013.01)

(58) Field of Classification Search
CPC ...... H04B 7/0617; H04B 7/06; H04B 7/0695; H04B 7/0632; H04B 7/0626
See application file for complete search history.

(56) References Cited

U.S. PATENT DOCUMENTS

| 8,855,002 B2 | 10/2014 | Park et al. |
| 2013/0163457 A1 | 6/2013 | Kim et al. |

(Continued)

FOREIGN PATENT DOCUMENTS

| CN | 1049353365 | 9/2015 |
| CN | 106412942 | 2/2017 |
| WO | WO2008147121 | 4/2008 |

OTHER PUBLICATIONS

International Search Report & Written Opinion; PCT/CN2017/074627; dated Nov. 15, 2017.

*Primary Examiner* — Faruk Hamza
*Assistant Examiner* — Abusayeed M Haque (57) ABSTRACT

Provided is a method of base station (BS) for channel state information (CSI) acquisition in a massive multiple input/multiple output (MIMO) communication system. The method comprises the steps at the BS of sending a set of beamformed reference signals (RSs) to a user equipment (UE) and receiving from said UE an indication of a subset of said set of beamformed RSs and CSI acquired by said UE for only said subset of said set of beamformed RSs. Also provided is a further method and a user equipment (UE) for CSI acquisition. The further method comprises the steps at the UE of receiving from the BS the set of beamformed RSs; estimating a channel of each RS comprising said set of beamformed RSs; selecting a subset of said set of beamformed RSs; acquiring CSI for only said selected subset of said set of beamformed RSs; and communicating to said BS an indication of said selected subset of said set of beamformed RSs and reporting the CSI acquired for said selected subset of said set of beamformed RSs.

27 Claims, 9 Drawing Sheets

(51) Int. Cl.
  *H04W 84/12* (2009.01)
  *H04L 1/00* (2006.01)
  *H04B 7/06* (2006.01)
  *H04L 5/00* (2006.01)
  *H04B 7/0413* (2017.01)

(56) References Cited

U.S. PATENT DOCUMENTS

| | | | |
|---|---|---|---|
| 2014/0010126 A1* | 1/2014 | Sayana | H04J 3/1694 370/280 |
| 2015/0124688 A1* | 5/2015 | Xu | H04B 7/0452 370/312 |
| 2016/0134352 A1 | 5/2016 | Stirling-Gallacher | |
| 2016/0277225 A1* | 9/2016 | Frenne | H04W 56/0015 |
| 2016/0308637 A1* | 10/2016 | Frenne | H04J 11/0069 |
| 2017/0317866 A1* | 11/2017 | Stirling-Gallacher | H04B 7/0695 |
| 2017/0374638 A1* | 12/2017 | Han | H04J 11/00 |
| 2018/0034529 A1* | 2/2018 | Hessler | H04B 7/0632 |
| 2018/0054772 A1* | 2/2018 | Tan | H04W 76/10 |

\* cited by examiner

$N_{beam} = 8$

| $B_{start}$ | L |   |   |   |   |   |   |   |
|---|---|---|---|---|---|---|---|---|
|  | 1 | 2 | 3 | 4 | 5 | 6 | 7 | 8 |
| 0 | 0 | 8 | 16 | 24 | 32 | 31 | 23 | 15 |
| 1 | 1 | 9 | 17 | 25 | 33 | 30 | 22 |   |
| 2 | 2 | 10 | 18 | 26 | 34 | 29 |   |   |
| 3 | 3 | 11 | 19 | 27 | 35 |   |   |   |
| 4 | 4 | 12 | 20 | 28 |   |   |   |   |
| 5 | 5 | 13 | 21 |   |   |   |   |   |
| 6 | 6 | 14 |   |   |   |   |   |   |
| 7 | 7 |   |   |   |   |   |   |   |

Fig. 12

METHOD AND APPARATUS FOR CHANNEL STATE INFORMATION (CSI) REPORTING IN A MASSIVE MIMO COMMUNICATIONS SYSTEM

FIELD OF THE INVENTION

The invention relates to a method and apparatus for Channel State Information (CSI) reporting in a massive multiple input/multiple output (MIMO) wireless communication system.

BACKGROUND OF THE INVENTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., frequency/time resources). Examples of such multiple-access technologies include time division multiple access (TDMA) systems, frequency division multiple access (FDMA) systems, code division multiple access (CDMA) systems, time division synchronous code division multiple access (TD-SCDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards preferably using OFDMA on the downlink (DL), SC-FDMA on the uplink (UL), and increasingly using MIMO antenna technology.

MIMO technology has matured for wireless communication systems and has been incorporated into wireless broadband standards such as LTE and Wi-Fi. Basically, the more antennas that the transmitter/receiver is equipped with, the greater the possible signal paths and the better the performance in terms of data rate and link reliability.

Massive MIMO also known as large-scale antenna systems, very large MIMO, hyper-MIMO and full-dimension (FD) MIMO makes a break with current MIMO practice through the use of a very large number of service antennas (e.g., hundreds or even thousands) that are operated fully coherently and adaptively. The very large number of antennas help by focusing the transmission and reception of signal energy into ever-smaller regions of space. This brings huge improvements in throughput and energy efficiency, in particular when combined with simultaneous scheduling of a large number of user terminals (e.g., tens or hundreds). Massive MIMO was originally envisioned for time division duplex (TDD) operation, but can be applied also in frequency division duplex (FDD) operation. Other benefits of massive MIMO include the extensive use of inexpensive low-power components, reduced latency, simplification of the media access control (MAC) layer, and robustness to interference and intentional jamming.

U.S. Pat. No. 8,855,002 discloses an apparatus for feeding back channel information to a base station (BS) connected to one or more User Equipments (UEs). The apparatus generates and feeds back CSI considering inter-UE interference due to an access of an additional UE. The feedback apparatus comprises a CSI reference signal (CSI-RS) receiver for receiving a CSI-RS from the BS, a channel estimator for estimating a channel by using the received CSI-RS, a demodulation RS (DM-RS) receiver for receiving a DM-RS of the additional UE, a precoder estimator for estimating a type of a precoder (PC) of the corresponding additional UE based on the received DM-RS of the additional UE and a channel estimation result by the channel estimator, a Multiple Access Interference (MAI) determiner for determining MAI based on information on the precoder of the additional UE estimated by the precoder estimator and the channel estimation result by the channel estimator, and a state information generating/transmitting unit for generating and feeding back CSI reflecting interference generated due to the additional UE according to the MAI.

WO2008147121 relates to MIMO feedback and transmission in a wireless communication system. It discloses a method of selecting a subset codebook or full code book based on traffic load of a BS, and broadcasting the selected codebook to UEs. In high traffic load, a subset codebook is selected, and in low traffic load, a full codebook is selected. UEs calculate a channel quality indicator (CQI) of a spatial codeword vector that is included in the selected codebook. Information of the maximum CQI is sent to the BS together with a precoder of the UE. The BS selects UEs based on the information of the maximum CQI and precoder, and transmits the preferred precoder signal and data signal to the UEs.

U.S. Pat. No. 9,485,661 discloses a method of facilitating the generation and use of separable, hierarchical channel state feedback in a wireless communication system. In the event that multiple network nodes, e.g. access points, cooperate to conduct DL transmissions to a UE, channel state feedback as reported by the UE can be separated into intra-node feedback relating to per-node channel conditions and inter-node feedback relating to relative phase and/or amplitude between channels corresponding to respective nodes. Further, a UE can select to report intra-node feedback and/or inter-node feedback based on network instructions, a cooperation strategy to be utilized by respective network nodes, or the like. Respective codebooks on which inter-node and intra-node channel feedback is based can be configured to convey information relating to a partial channel description and/or to vary based on resource units (e.g., sub-bands, resource blocks, etc.) utilized for DL communication. More specifically, the disclosed method involves analyzing parameters relating to a mobility of an associated UE, e.g. cellular telephone, and network back-haul conditions. A DL coordination strategy is selected to be utilized across the network nodes for communication with the associated UE based on the analyzed parameters. The associated UE is instructed to provide a per-node channel state feedback and an inter-node channel state feedback based on the selected DL coordination strategy. The feedbacks are received from the associated UE unit.

US2013/0163544 discloses a method in a massive MIMO wireless communication system of beamforming and information feedback. Signals for beams to be transmitted through corresponding antenna ports of a BS, are generated. The beams are formed by precoding the signals with beamforming vectors. The beams are sorted into a number of resource reuse groups based on a resource that is to be shared. The beams are transmitted, using resources allocated per group, to a UE. Feedback information is generated at the UE on at least one antenna port, based on the received beams. The feedback information is transmitted to the BS. A beam is selected having a greatest gain for a BS using the feedback information. A transmission resource is allocated for the selected beam.

One of the major changes from Fourth Generation (4G) or LTE to Fifth Generation (5G) massive MIMO mobile network (wireless) communication systems is, as indicated above, the number of antennas in each BS or transmission reception point (TRP). The number of antennas for 4G/LTE is typically less than 16 antennas per BS (up to Release 13), where the number of antennas for 5G massive MIMO is typically more than 100 antennas per BS and could be as many as thousands. As there are 100 or more antennas within a BS, the beam width of each antenna can be much narrower. Nonetheless, the probability of channel blockage due to narrow beam width will be increased. Therefore, a method of selecting one or more subsets of antennas to provide optimal throughput is very desirable.

OBJECTS OF THE INVENTION

An object of the invention is to mitigate or obviate to some degree one or more problems associated with massive MIMO communication systems.

The above object is met by the combination of features of the main claims; the sub-claims disclose further advantageous embodiments of the invention.

Another object of the invention is to provide a method and apparatus for selecting one or more subsets of antennas for data transmission from a BS to a UE in a massive MIMO communication system.

Another object of the invention is to mitigate or obviate to some degree one or more problems associated with known communication systems.

One skilled in the art will derive from the following description other objects of the invention. Therefore, the foregoing statements of object are not exhaustive and serve merely to illustrate some of the many objects of the present invention.

SUMMARY OF THE INVENTION

In a first aspect, the invention provides a method and a system for CSI acquisition in a massive MIMO communication system. The system comprises a massive MIMO BS and at least one UE. The BS has a massive number of antennas, e.g., 100 or more. The UE may also have a massive number of antennas. The method comprises the steps in the system of the BS transmitting the set of beamformed RSs to the UE; the UE selecting a subset of said set of beamformed RSs; the UE acquiring CSI for only said selected subset of said set of beamformed RSs; and the UE communicating to said BS an indication of said selected subset of said set of beamformed RSs and reporting the CSI acquired for said selected subset of said set of beamformed RSs. Preferably, said step of selecting a subset of said set of beamformed RSs comprises estimating the channel of each RS comprising said set of beamformed RSs. Preferably, prior to the step of sending a set of beamformed RSs to the UE, the method includes determining the set of beamformed RSs which are to be sent to the UE. This may include determining the set of beamformed RSs which are to be sent to a group of UEs having similar directional properties. Preferably, the BS transmits payload data to the UE based on the CSI received by the BS from the UE for said selected subset of said set of beamformed RSs. In a second aspect, the invention provides a method and a BS for CSI acquisition in a massive MIMO communication system. The method comprises the steps at the BS of sending a set of beamformed RSs to a UE and receiving from said UE an indication of a subset of said set of beamformed RSs and CSI acquired by said UE for only said subset of said set of beamformed RSs. Preferably, prior to the step of sending a set of beamformed RSs to the UE, the method includes determining the set of beamformed RSs which are to be sent to the UE.

In a third aspect, the invention provides a method and a UE for CSI acquisition in a massive MIMO communication system. The method comprises the steps at the UE of receiving from the BS the set of beamformed RSs; selecting a subset of said set of beamformed RSs; acquiring CSI for only said selected subset of said set of beamformed RSs; and communicating to said BS an indication of said selected subset of said set of beamformed RSs and reporting the CSI acquired for said selected subset of said set of beamformed RSs. Preferably, said step of selecting a subset of said set of beamformed RSs comprises estimating the channel of each RS comprising said set of beamformed RSs.

In a fourth aspect, the invention provides a non-transitory computer readable medium storing machine executable instructions, which, when such instructions executed by a processor, configure the processor to implement the steps of the methods of any of the first, second or third aspects of the invention.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be understood that the elements shown in the FIGS. may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 1:
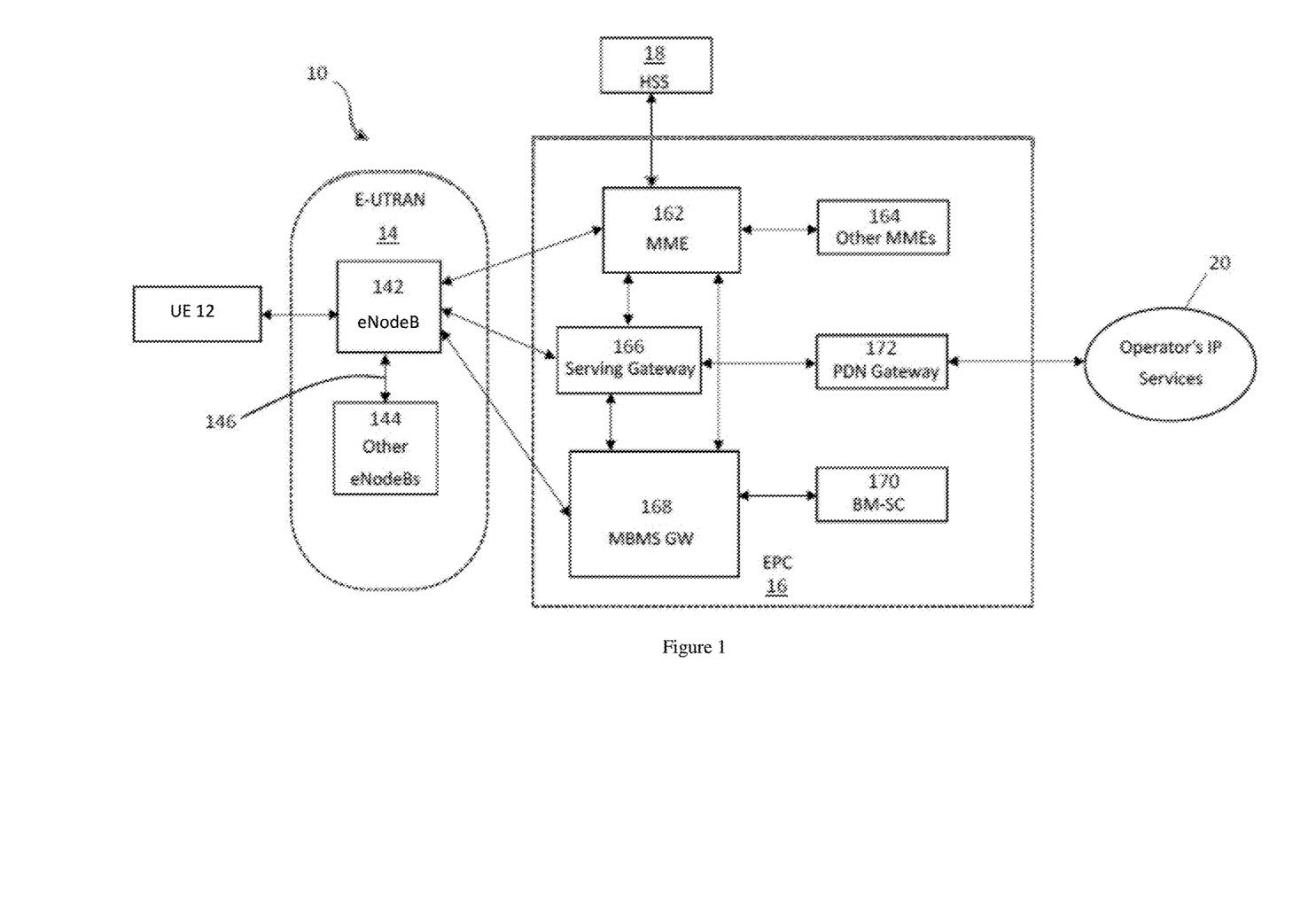
FIG. 1 is a diagram illustrating by way of example only a network architecture for embodiments of the present invention.

FIG. 1 is a diagram illustrating, merely by way of example only, an LTE network architecture 10 in which the methods of the present invention can be performed, but it will be understood by one skilled in the art that the methods may be performed in other network architectures. The LTE network architecture 10 of FIG. 1 may be referred to as an Evolved Packet System (EPS) 10. The EPS 10 may include one or more user equipment (UE) 12, an Evolved UMTS Terrestrial Radio Access Network (E-UTRAN) 14, an Evolved Packet Core (EPC) 16, a Home Subscriber Server (HSS) 18, and an Operator's Internet Protocol (IP) Services 20. The EPS 16 can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN 14 includes an eNB 142 and other eNBs 144. The eNB 142 provides user and control plane protocol terminations toward the UE 12. The eNB 142 may be connected to the other eNBs 144 via a backhaul (e.g., an X2 interface) 146. The eNB 142 may also be referred to herein as a BS, a Node B, an access point, a TRP, a base transceiver station, a radio base station, a radio transceiver, a transceiver function, a basic service set (BSS), an extended service set (ESS), or some other suitable terminology. The eNB 142 provides an access point to the EPC 16 for a UE 12. Examples of a UE 12 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 142 is connected to the EPC 16. The EPC 16 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 is the control node that processes the signaling between the UE 12 and the EPC 16. Generally, the MME 162 provides bearer and connection management. All user IP packets are transferred through the Serving Gateway 166, which itself is connected to the PDN Gateway 172. The PDN Gateway 172 provides UE IP address allocation as well as other functions. The PDN Gateway 172 is connected to the Operator's IP Services 20. The Operator's IP Services 20 may include the Internet, an intranet, an IP Multimedia Subsystem (IMS), and a PS Streaming Service (PSS). The BM-SC 170 may provide functions for MBMS user service provisioning and delivery. The BM-SC 170 may serve as an entry point for content provider MBMS transmission, may be used to authorize and initiate MBMS Bearer Services within a PLMN, and may be used to schedule and deliver MBMS transmissions. The MBMS Gateway 168 may be used to distribute MBMS traffic to the eNBs (e.g., 142, 144) belonging to a Multicast Broadcast Single Frequency Network (MBSFN) area broadcasting a particular service, and may be responsible for session management (start/stop) and for collecting eMBMS related charging information.

Figure 2:
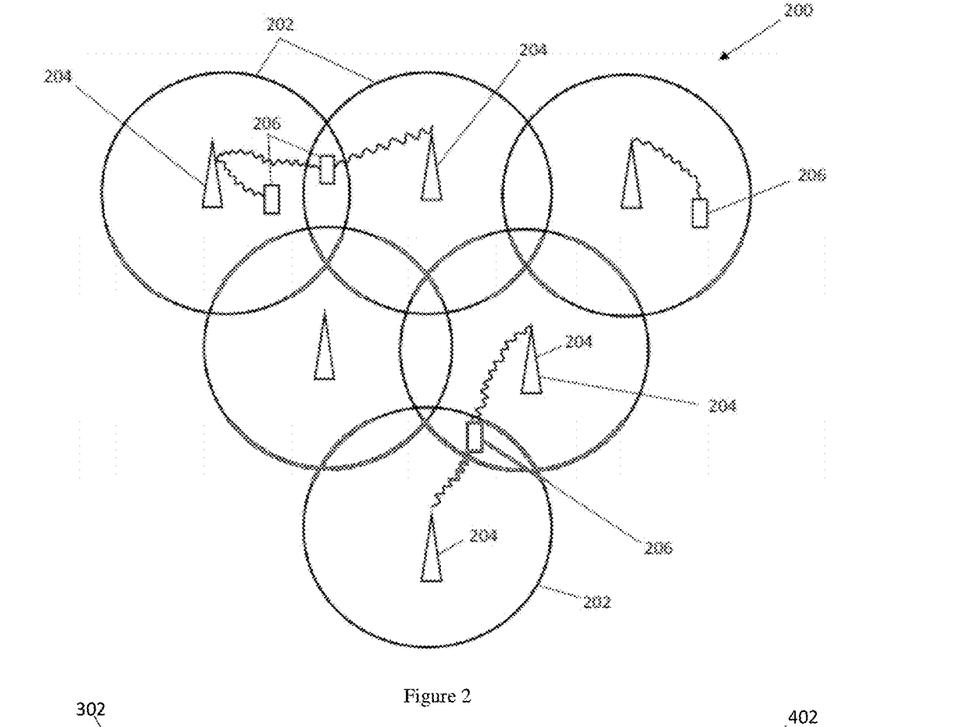
FIG. 2 is a diagram illustrating by way of example only an access network for embodiments of the present invention.

FIG. 2 is a diagram illustrating an example of an access network 200 in an LTE network architecture such as that described with respect to FIG. 1. In this example, the access network 200 is divided into a number of cellular regions (cells) 202. There is no centralized controller in this example of an access network 200, but a centralized controller may be used in some configurations. The eNBs 204 may be configured to provide all radio related functions including radio bearer control, admission control, mobility control, scheduling, security, and connectivity to the serving gateway 166. An eNB may support one or multiple cells (also referred to as a sector). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is preferably used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
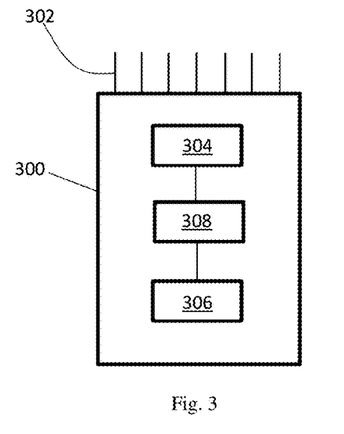
FIG. 3 illustrates a BS for embodiments of the invention.

FIG. 3 illustrates a basic structure of a BS (eNB) 300 for implementing the methods of the invention. The BS 300 comprises a massive number of 100 or more antenna elements 302 (only a small number of antenna elements are shown for clarity of the drawing), a communications module 304 for communicating wirelessly with a UE and communicating with other components of a wireless communication system. The BS 300 is also provided with a non-transitory memory 306 storing machine readable instructions for execution by a processor 308. When executing the machine instructions, the processor 308 configures the BS 300 to implement the methods of the invention.

Figure 4:
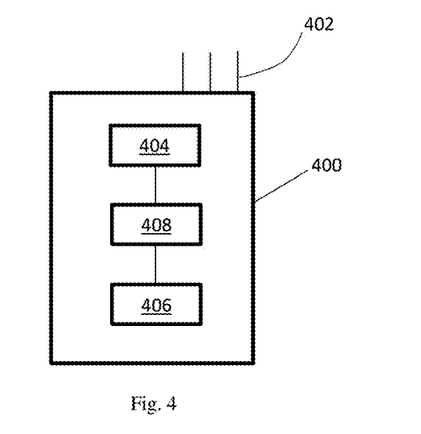
FIG. 4 illustrates a UE for embodiments of the invention.

FIG. 4 illustrates a basic structure of a UE 400 for implementing the methods of the invention. The UE 400 comprises at least one antenna 402, but may include multiple antennas 302 or even a massive number of 100 or more antenna elements 402. It is also provided with a communications module 404 for communicating wirelessly with one or more BSs 300. The UE 400 also has a non-transitory memory 406 storing machine readable instructions for execution by a processor 408. When executing the machine instructions, the processor 408 configures the UE 400 to implement the methods of the invention.

Figure 5A:
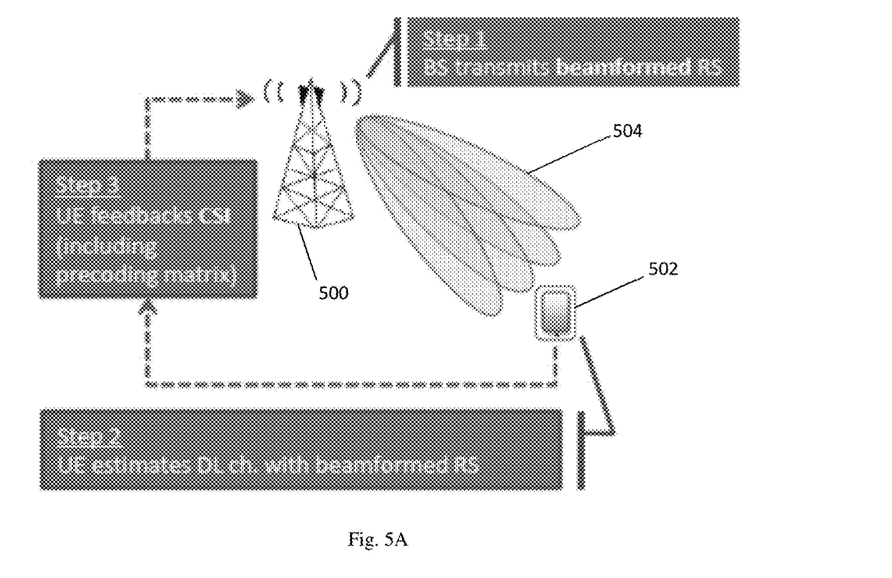
FIG. 5A illustrates an existing beamformed RS and CSI acquisition method in a MIMO communications system.
Figure 5B:
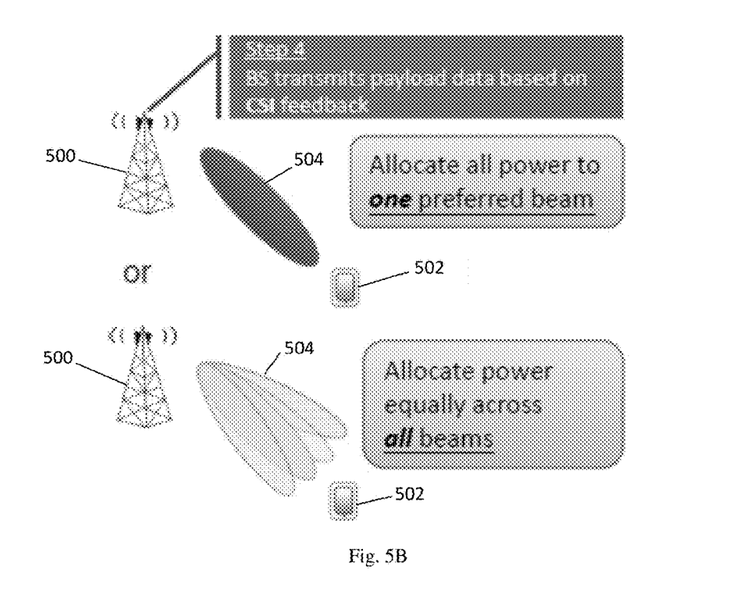
FIG. 5B illustrates transmitting payload data by allocating all power to one preferred beam or equally across all beams.

By way of contrast with the methods of the invention described below, FIG. 5A illustrates an existing beamformed RS and DL CSI acquisition method in a MIMO wireless communication system whilst FIG. 5B illustrates transmitting payload data from a BS 500 by allocating all power to a preferred one of its antenna ports or equally across all of its antenna ports based on CSI feedback to a UE 502.

The existing method illustrated by FIGS. 5A and 5B comprises a first step of the BS 500 transmitting beamformed RSs to the UE 502. In a second step, the UE 502 performs a DL channel estimation of all of the beamformed RSs in a known manner and, in a third step, the UE 502 feeds back CSI for all of the channel estimated beamformed RSs to the BS 500. The CSI fed back by the UE 502 includes a precoding matrix again in a known manner consistent with the existing 3GPP standards. A fourth step as illustrated by FIG. 5B comprises the BS 500 transmitting payload data on the DL to the UE 502. The BS 500 utilizes the reported CSI from the UE 502 to either allocate all DL signal power to one beam 504 of the set of beamformed RSs or to allocate the signal power equally across all beams 504. It will be appreciated that the first option of allocating power to a preferred single beam increases the risk of channel blockage due to narrow beam width whereas the second option of allocating the power over all beams does not provide an efficient use of DL resources.

Massive MIMO when compared to classical MIMO can be considered as an operating condition of a wireless communication system where multiuser interference and noise are small compared to pilot contamination. This depends in general on several factors: the number of BS antennas, the number of UEs per degree of freedom offered by the channel where the degree of freedom comprises the rank of the antenna correlation matrix which might be smaller than the number of BS antennas, the signal-to-noise ratio (SNR) and the path loss. Generally speaking, however, massive MIMO is considered as applicable in wireless communication systems operating according to the 3GPP standards where at least the BS has 100 or more antennas and possibly involving hundreds or even thousands of antennas installed at the BS. It is also envisaged that UEs will have multiple antennas and may have massive numbers of antennas or antenna elements in excess of 100 or more. Massive MIMO promises significant gains in wireless network capacity, spectrum efficiency as well as offering the possibility of greatly reducing energy consumption, enhancing the reliability and reducing latency.

Whilst massive MIMO is viewed as an enabler of the next generation of wireless communications, so-called 5G, it is applicable to the current generation LTE standard. In fact, the Third Generation Partnership Project (3GPP) has defined the notion of "Transmission Modes" (TMs) for different usage of MIMO in LTE, which can be categorized as transmit diversity, spatial multiplexing and beam-forming. TM 7 is defined in 3GPP Release 8, where an arbitrary number of physical antennas at the BS can be used as a logical antenna port (port 5) to create a narrow beam towards a targeted UE. Release 9 extends TM 7 to TM 8, giving the possibility of transmitting a dual stream to a single or two UEs, whereas in release 10, this is further extended to TM 9 where up to 8 layers for a single user transmission and up to 4 layers for multi-user transmission is supported. Release 11 adds TM 10, similar to TM 9 with up to 8 layers transmission but the transmit antennas can be physically located on different BS s. In Release 13, no new transmission mode is defined, but CSI RS has been extended to 16 ports. Moreover, Release 14 on the enhancement of Full-Dimension MIMO (considered as a special case of Massive MIMO in 3GPP) for LTE has extended the CSI RS to 32 ports with enhancement on CSI reports and support for providing higher robustness against CSI impairments. The methods of the invention are applicable to future 5G communication systems as well as applicable to existing LTE communication systems as illustrated by way of example by FIGS. 1 and 2.

In a massive MIMO wireless communication system, allocating power for DL data transmission to either one preferred beam or equally across all beams as seen in the existing system illustrated by FIGS. 5A and 5B cannot provide optimal data throughput. Consequently, a method of selecting one or more subsets of antennas to provide optimal throughput is very desirable.

For a massive MIMO wireless communication system in accordance with the invention, the inclusion of a massive number of antennas in the BS allows the beam width of beamformed RSs to be very narrow, but this increases the probability of channel blockage for any one narrow beam, and the received power or some other signal parameter of different beamformed RSs at any one UE may vary significantly. The present invention recognizes that only a few 'strong' beams are useful for any one UE serviced by a BS and that, for a large numbers of UEs serviced by a BS, a group of beamformed RSs can be shared among multiple UEs.

Figure 6:
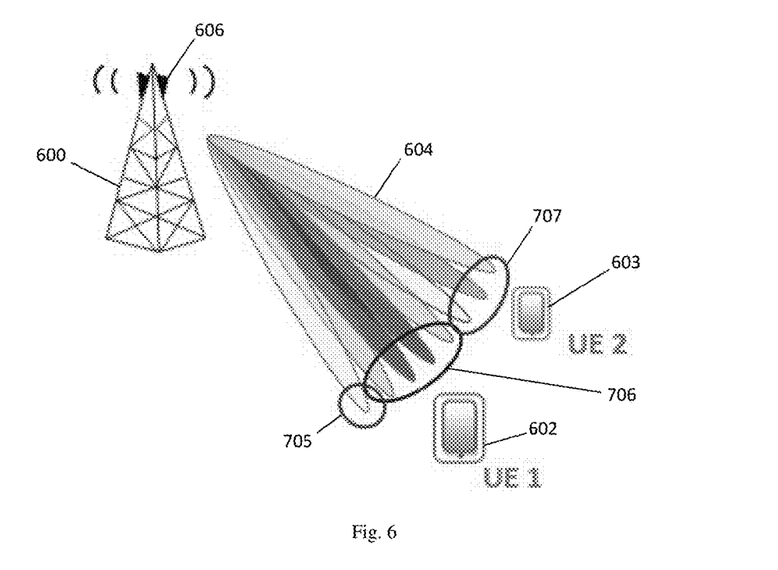
FIG. 6 illustrates subsets of antenna ports communicated between BS and UEs.

For a massive MIMO wireless communication system in accordance with the invention, FIG. 6 shows an example of multiple antenna ports or beams 604 connected between the BS 600 and UE1 602 and UE2 603. The BS 600 is configured with a massive number of antennas 606.

Figure 7:
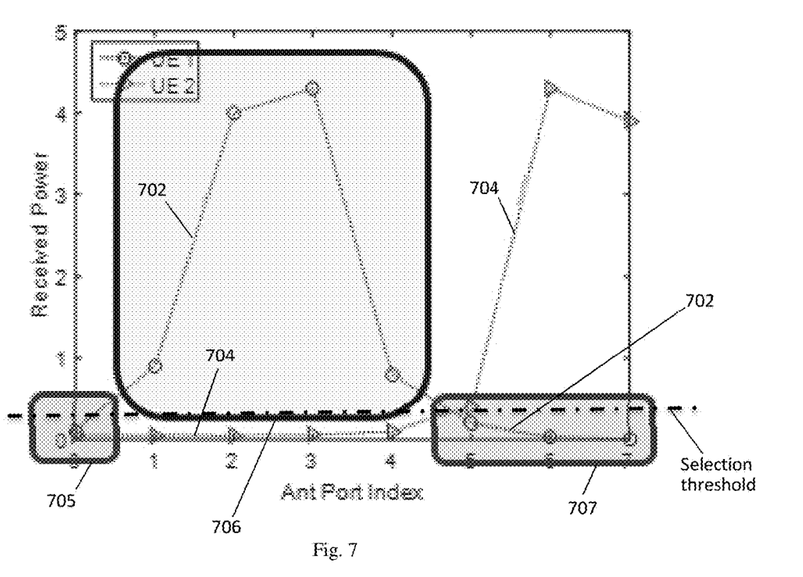
FIG. 7 illustrates a chart showing the received signal power for each BS antenna port at different UEs.

FIG. 7 shows by way of example a chart of received signal power measured by each of UE1 602 and UE2 603 for each antenna port or beam 604 in the system of FIG. 6. Each antenna port can be considered as a beam. Chart curve 702 comprises the received signal power measurements made by UE1 602 whilst chart curve 704 comprises the received signal power measured by UE2 603. In the chart of FIG. 7, it can be seen that the 8 antenna ports indexed as ports 0 through to 7 can be grouped as a first subset 705 comprising antenna port 0 (leftmost beam 604 in FIG. 6), a second subset 706 comprising antenna ports 1 to 4 (near centre beams in FIG. 6), and a third subset 707 comprising antenna ports 5 to 7 (rightmost group of beams in FIG. 6). Consequently, it can be seen from chart curve 702 that UE1 602 detects high antenna power on the second subset 706 of antenna ports whilst UE2 detects high antenna power on the third subset 706 of antenna ports. It follows therefore that UE1 602 is better served for DL data transmission by antenna ports 1 to 4 whilst UE2 603 is better served for DL data transmission by antenna ports 5 to 7; antenna port 0 is of little use on DL data transmission to either of UE1 602 or UE2 603.

Figure 8:
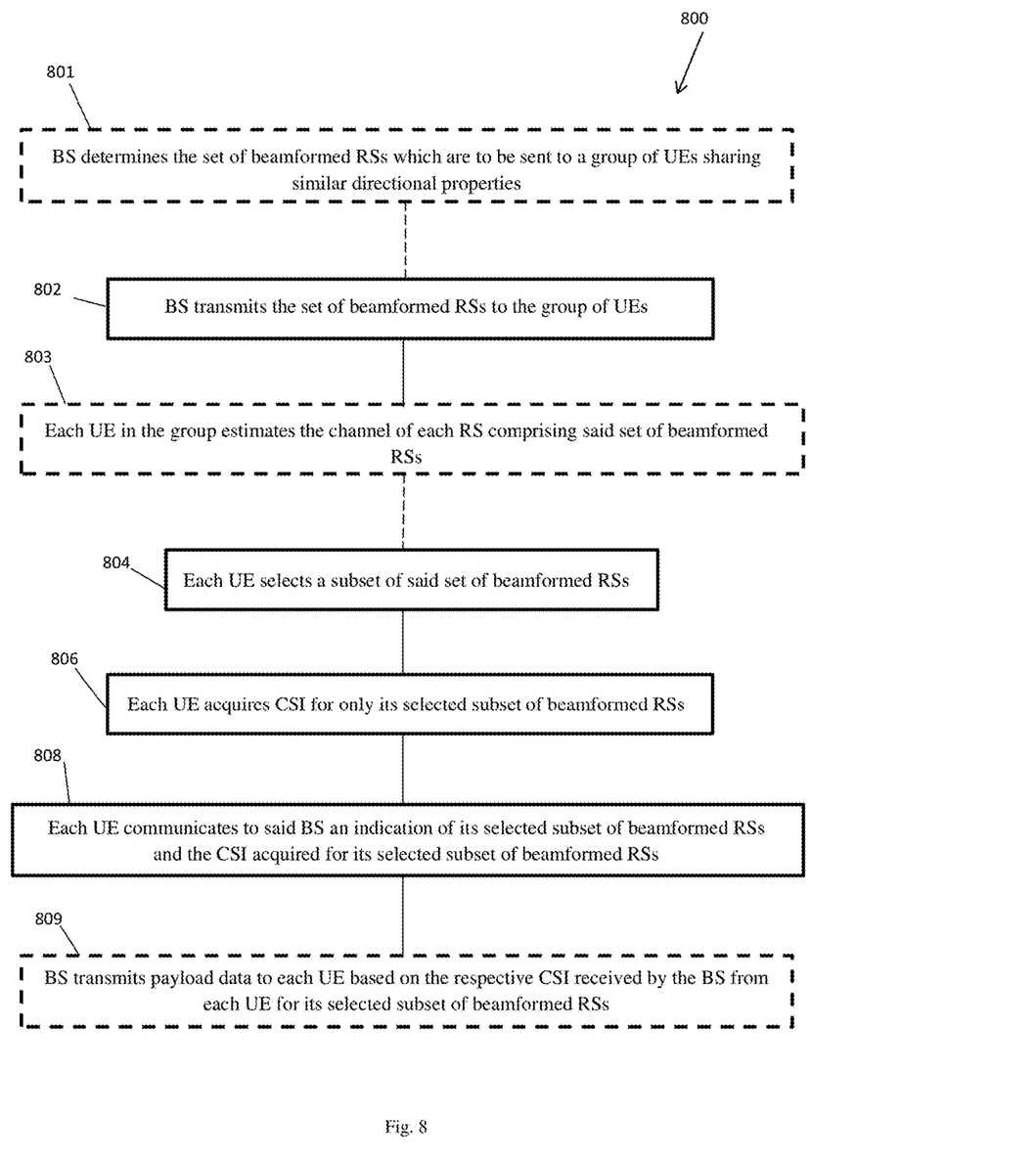
FIG. 8 illustrates a flowchart of the method of selecting a subset of antenna ports and feeding back the result to the BS in a system in accordance with the invention.

FIG. 8 provides a flow chart 800 of a method in accordance with the invention of selecting one or more subsets of antennas to provide optimal throughput on DL data transmission in a massive MIMO wireless communication system. The method comprises a first step 802 of the BS 600 transmitting the set of beamformed RSs to a group of UEs 602 with similar directional properties serviced by the BS 600. Each UE 602 of the group on receiving the set of beamformed RSs then selects 804 a subset of said set of beamformed RSs (beams/antenna ports). Each UE 602 then acquires 806 CSI for only its selected subset of said set of beamformed RSs. Each UE 602 communicates 808 to said BS 600 an indication of its selected subset of said set of beamformed RSs and the CSI acquired for only its selected subset of said set of beamformed RSs. The method may include a step 801, prior to the step 802 of sending a set of beamformed RSs to UEs 602, of determining the set of beamformed RSs which are to be sent to the group of UEs 602 having similar directional properties. The step 804 at each UE 602 of selecting a subset of said set of beamformed RSs may comprise each UE 602 of the group first estimating 803 a channel of each RS comprising said set of beamformed RSs. A final step 809 may comprise the BS 600 transmitting payload data to each UE 602 in compliance with the respective CSI received by the BS 600 from each UE 602 for only its selected subset of said set of beamformed RSs.

Figure 9:
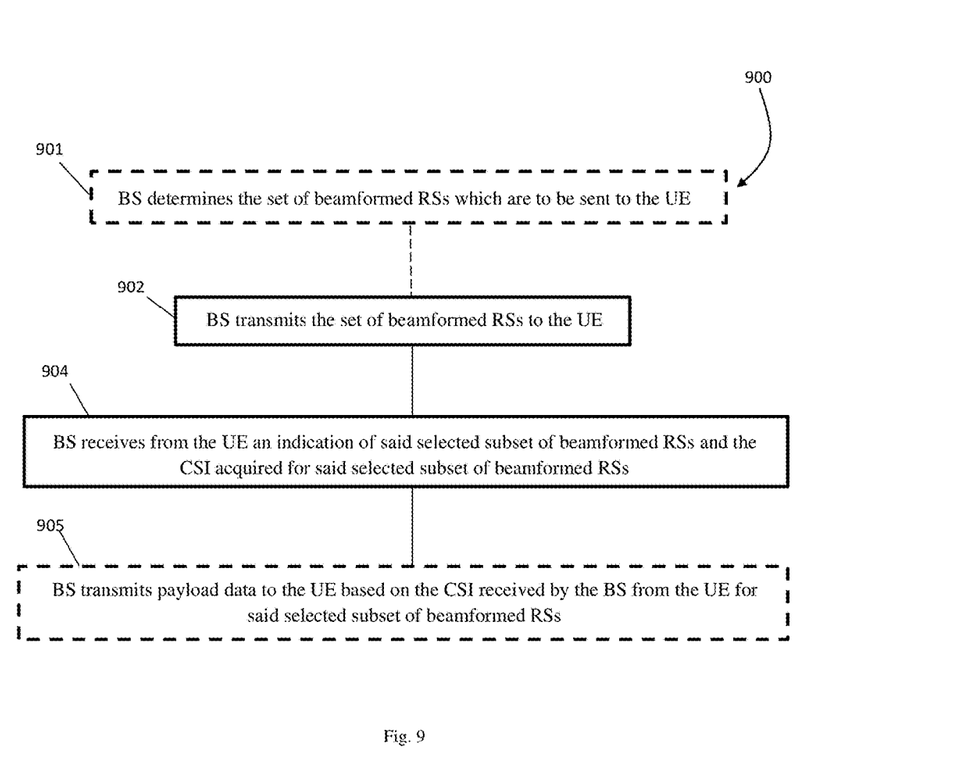
FIG. 9 illustrates a flowchart of the method steps relating to the flowchart of FIG. 8 implemented by the BS.

FIG. 9 provides a flow chart 900 of a method in accordance with the invention from the perspective of the BS 600. In this case, reference will be made to only one UE 602, but the BS 600 is capable of performing the steps simultaneously for a group of UEs 602. The method comprises a first step 902 of the BS 600 transmitting a set of beamformed RSs to the UE 602. A second step 904 comprises the BS 600 receiving from the UE 602 an indication of said selected subset of said set of beamformed RSs and the CSI acquired by the UE for only said selected subset of said set of beamformed RSs. The method may include a step 901, prior to the step 902 of transmitting a set of beamformed RSs to the UE 602, of determining the set of beamformed RSs which are to be sent to the UE 602. A final step 905 may comprise the BS 600 transmitting payload data to the UE 602 in compliance with the CSI received by the BS 600 from the UE 602 for only said selected subset of said set of beamformed RSs.

Figure 10:
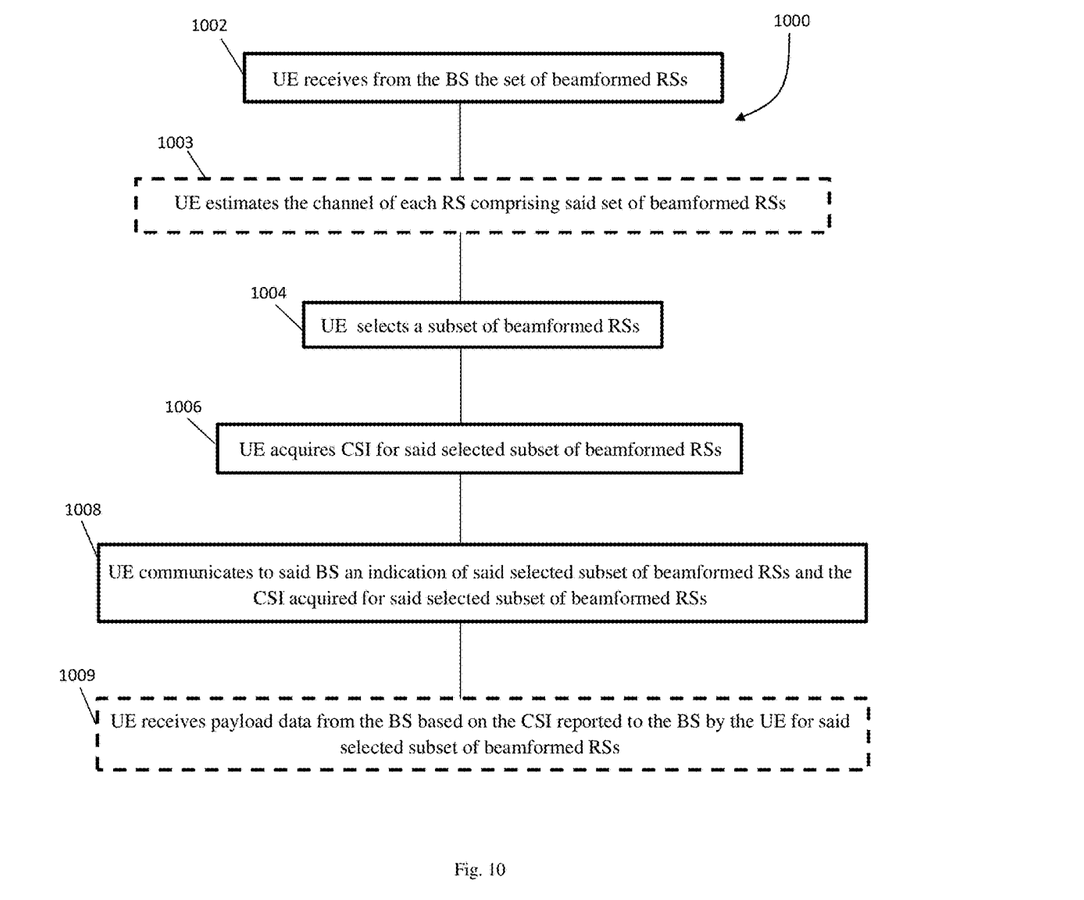
FIG. 10 illustrates a flowchart of the method steps relating to the flowchart of FIG. 8 implemented by the UE.

FIG. 10 provides a flow chart 1000 of a method in accordance with the invention from a perspective of a UE 602. The method comprises a first step 1002 of the UE 602 receiving from the BS 600 a set of beamformed RSs. The UE 602 on receiving the set of beamformed RSs then selects 1004 a subset of said set of beamformed RSs. The UE 602 then acquires 1006 CSI for only said selected subset of said set of beamformed RSs. The UE 602 communicates 1008 to said BS 600 an indication of said selected subset of said set of beamformed RSs and the CSI acquired for only said selected subset of said set of beamformed RSs. The step 1004 of selecting a subset of said set of beamformed RSs may comprise first estimating 1003 a channel of each RS comprising said set of beamformed RSs. A final step 1009 may comprise the UE 602 receiving payload data from the BS 600 based on the CSI reported to the BS 600 by the UE 602 for only said selected subset of said set of beamformed RSs.

One advantage of selecting a subset of antenna ports for DL data transmission is that the DL signal from the BS 600 to the UE 602 is implemented on 'strong' beams rather than wasting resources on 'weak' beams leading to an improved performance. Preferably, the selected subset comprises two or more antenna ports/beams/beamformed RSs.

Whilst the step of estimating the channel of each RS comprising said set of beamformed RSs may be based on measuring the received signal power as discussed above, other parameters of the RS beams 604 may be utilized in the estimation process, alone or in combination. For example, the parameter of each beam 604 to be measured may comprise any one or any combination of: received power; signal to noise ratio; signal to interference ratio; and energy per bit to noise power spectral density ratio, etc. The channel estimation process may include selecting a subset of said set of beamformed RSs 604 by selecting RSs 604 whose measured parameter is above a predetermined threshold value, e.g. above a threshold received power level. It is, however, preferred that the subset of selected RSs 604 comprise a contiguous group as illustrated by FIGS. 6 and 7. In such a case, the selection may be based on selecting a subset of said set of beamformed RSs 604 comprising those RSs 604 whose measured signal parameter falls within a range determined from the RS whose measured signal parameter is largest. For example, as seen in FIGS. 6 and 7, for the second subset 706 for UE1 602, the antenna port with largest measured received signal power by UE1 602 is antenna port 3 with antenna port 2 close behind. Whilst the measured received signal power of antenna ports 1 and 4 are much less that that for antenna port 3, they are considered to be within an acceptable range below that measured for antenna port 3 as to still comprise part of the selected contiguous antenna ports for DL data transmission from BS 600 to USE1 602. Thus, the UE 602 may determine which antenna has the highest receiving power, calculate an acceptable range based on the predetermine percentage of the highest receiving power, and select the antennas within the acceptable range.

To reduce signaling overhead when communicating from the UE 602 to the BS 600 the indication of a selected subset of said set of beamformed RSs 604 and the CSI acquired for only said selected subset of said set of beamformed RSs 604, it is preferred to use a selected subset indication value (SSIV) derived from an identity of one of the RSs 604 selected as comprising part of the selected subset and a number of contiguous RSs 604 forming the selected subset. The identity of a start RS 604 in the contiguous group of preferred. Thus, the SSIV value can be given by the equation:

$$SSIV = \begin{cases} N_{beam}(L-1) + B_{start}, & \text{if } L-1 \leq \lfloor N_{beam}/2 \rfloor \\ N_{beam}(N_{beam}+1-L) + (N_{beam}-1-B_{start}) & \text{else} \end{cases}$$

where $N_{beam}$ is the number of RSs in the set of beamformed RSs transmitted to the UE from the BS;
L=the length of contiguous selected beams; and
$B_{start}$ is an antenna port number of a starting RS in the contiguous RSs forming the selected subset.

Figure 12:
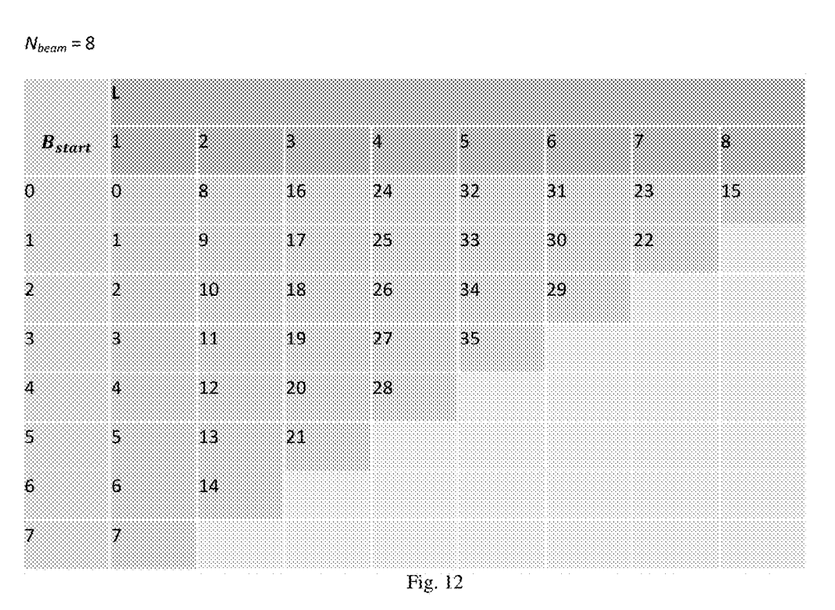
FIG. 12 provides a table of SSIV values for 8 antenna ports.

Based on the example shown in FIG. 6, there are 8 antenna ports. The first antenna port is antenna 0 and the last antenna port is antenna 7. The selected antenna ports for UE1 602 shown are ports 1 to 4. Therefore, $B_{start}$ is equal to 1, L is equal to 4 and $N_{beam}$ is equal to 8. An example of SSIV table is shown in FIG. 12 when $N_{beam}$ is equal to 8. The SSIV for the example in FIG. 6 is 25.

According to example of FIG. 6, UE1 602 selects second subset of antenna ports 706, obtains CSI corresponding to said second subset of antenna ports 706 and feeds back the subset selection and corresponding CSI back to the BS 600 using the corresponding SSIV. UE2 603 selects the third subset of antenna ports 707, obtains the CSI corresponding to only said third subset of antenna ports 707 and feeds back the subset selection and corresponding CSI back to the BS 600 using the corresponding SSIV.

Figure 11:
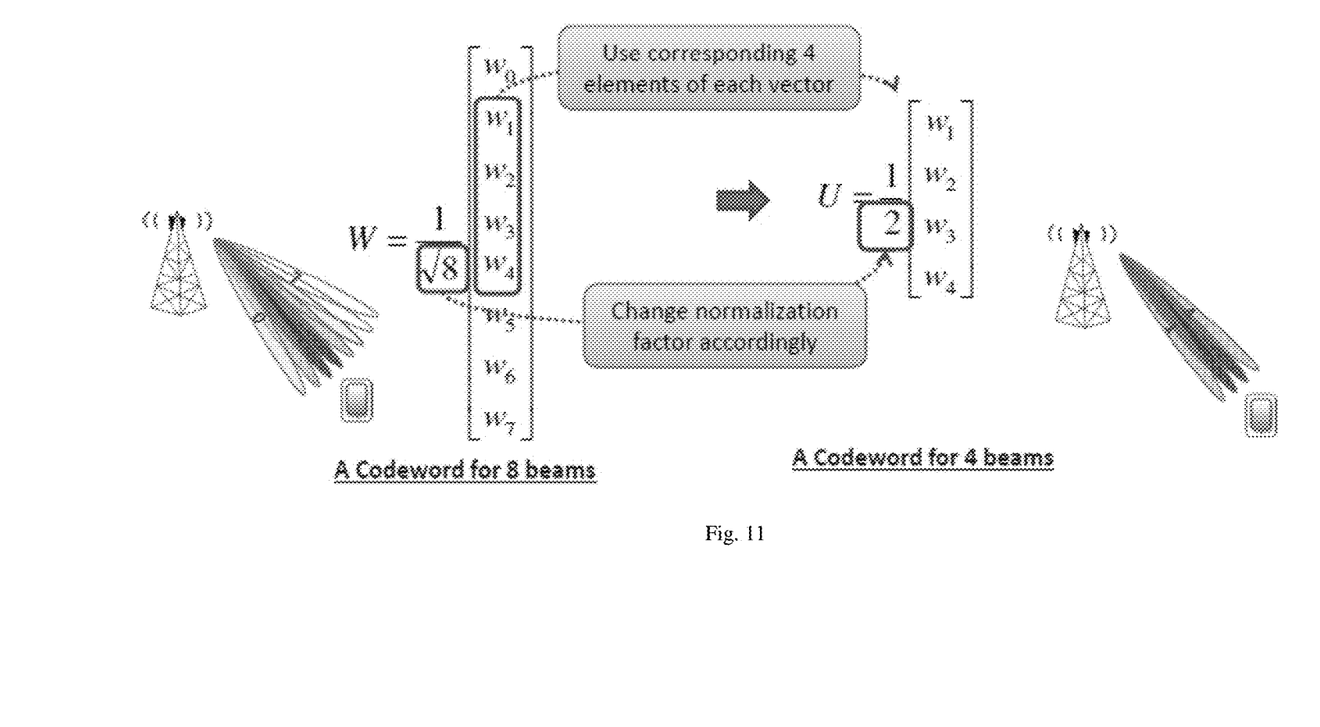
FIG. 11 illustrates an example of codeword construction based on the method shown in FIGS. 6 and 7, where 4 antennas are selected out of 8 antenna ports.

In order to achieve efficient data transmission, only the CSI of the selected subset of antenna ports is reported back to the BS 600 by the UE 602. As shown in FIG. 11, a legacy codebook for 8 antennas can be reduced to a legacy codebook of 4 antennas. A new codebook will be used for PMI determination with the selected subset of RSs. In the new codebook, each of the codewords has M elements (the cardinality of the selected subset, each element corresponds to the weight to be added on one of the selected RSs) and is generated based on the corresponding codeword of an existing codebook (see FIG. 11). This has the advantage of maximally reusing the existing standard codebooks thereby amounting to a simple extension of the existing standard by avoiding introducing additional codebooks for different numbers of selected antennas. In addition, the normalization factor is changed according to the number of selected antennas reported back to the BS. Thus, the CSI acquired for said selected subset of said set of beamformed RS s/antennas comprises finding a precoding matrix indicator (PMI) from the existing codebook with each codeword comprising M elements of the codeword in the codebook for all RSs for each layer, where M is the cardinality of the selected subset of RSs.

The step of acquiring CSI for only said selected subset of said set of beamformed RSs further comprises acquiring at least one of a Rank Indicator (RI) and a Channel Quality Indicator (CQI), besides a PMI.

It is preferred that the set of beamformed RSs 604 received at the UE 602 from the BS 600 share similar channel characteristics.

Other features of the invention include that the set of beamformed RSs transmitted from the BS is preferably determined based on the UE-specific or UE group-specific channel statistics and that the received beamformed RS s are preferably further determined by a received beamforming matrix at the UE.

Selecting a subset of beamformed RS may be based on the received power of all beamformed RS s and a predetermined threshold (β) such that a beamformed RS is selected if its received power is larger than the maximum power of all RS multiplying β.

The time period for feeding back the indication of the selected RS subset is a multiple of that of the corresponding CSI.

The invention also provides a BS having a memory; and a processor connected to the memory configured to: send a set of beamformed RSs to a UE; and receive from said UE an indication of a subset of said set of beamformed RSs and CSI acquired by said UE for only said subset of said set of beamformed RSs.

The invention also provides a UE having a memory; and a processor connected to the memory configured to: receive from a BS a set of beamformed RSs; select a subset of said set of beamformed RSs; acquire CSI for only said selected subset of said set of beamformed RSs; and communicate to said BS an indication of said selected subset of said set of beamformed RSs and the CSI acquired for said selected subset of said set of beamformed RSs.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of channel state information (CSI) acquisition in a multiple input/multiple output (MIMO) communication system, comprising the steps at a user equipment (UE) of:
   receiving from a base station (BS) a set of beamformed downlink (DL) reference signals (DL-RSs);
   selecting a subset of said set of beamformed DL-RSs;
   acquiring CSI for only said selected subset of said set of beamformed DL-RSs; and
   communicating to said BS an indication of said selected subset of said set of beamformed DL-RSs and the CSI acquired for said selected subset of said set of beamformed DL-RSs;
   wherein the step of communicating to said BS an indication of said selected subset of said set of beamformed DL-RSs comprises communicating a selected subset indication value (SSIV) derived from a number of contiguous DL-RSs forming the selected subset and an identity of a DL-RS at a starting edge of the contiguous subset with respect to an antenna port number.

2. The method of claim 1, wherein the MIMO communication system is any of a massive MIMO communication system, a large-scale antenna communication system, a very large MIMO communication system, a hyper MIMO communication system, or a full-dimension (FD) MIMO communication system.

3. The method of claim 2, wherein the step of selecting a subset of said set of beamformed DL-RSs comprises estimating each DL-RS comprising said set of beamformed DL-RSs.

4. The method of claim 1, wherein the UE receives payload data from the BS based on the CSI communicated by the UE to the BS for said selected subset of said set of beamformed DL-RSs.

5. The method of claim 1, wherein the step of estimating each DL-RS comprising said set of beamformed DL-RSs comprises measuring a parameter of each DL-RS comprising said set of beamformed DL-RSs.

6. The method of claim 5, wherein the parameter of each DL-RS to be measured comprises any one or any combination of: received power; signal to noise ratio; signal to interference ratio; and energy per bit to noise power spectral density ratio.

7. The method of claim 5, wherein the step of selecting a subset of said set of beamformed DL-RSs comprises selecting a subset of DL-RSs whose measured parameter is above a predetermined threshold value.

8. The method of claim 5, wherein the step of selecting a subset of said set of beamformed DL-RSs comprises selecting a contiguous subset of DL-RSs where a measured parameter for each RS falls within a range determined from a DL-RS whose measured signal parameter is largest.

9. The method of claim 1, wherein the SSIV is given by the equation:

$$SSIV = \begin{cases} N_{beam}(L-1) + B_{start}, & \text{if } L-1 \leq \lfloor N_{beam}/2 \rfloor \\ N_{beam}(N_{beam}+1-L) + (N_{beam}-1-B_{start}) & \text{else} \end{cases}$$

Where $N_{beam}$ is the number of DL-RSs in the set of beamformed DL-RSs transmitted to the UE from the BS;
L=the length of contiguous selected beams; and
$B_{start}$ is an antenna port number of a starting DL-RS in the contiguous DL-RSs forming the selected subset.

10. The method of claim 1, wherein the step of acquiring CSI for only said selected subset of said set of beamformed DL-RSs further comprises acquiring at least one of a Rank Indicator (RI) or a Channel Quality Indicator (CQI).

11. The method of claim 1, wherein the set of beamformed DL-RSs received at the UE from the BS comprise beamformed CSI-RSs.

12. A user equipment (UE) for a multiple input/multiple output (MIMO) communication system, said UE comprising:

a memory; and
a processor connected to the memory configured to:
receive from a base station (BS) a set of beamformed downlink (DL) reference signals (DL-RSs);
estimate a channel of each DL-RS comprising said set of beamformed DL-RSs;
select a subset of said set of beamformed DL-RSs;
acquire CSI for only said selected subset of said set of beamformed DL-RSs; and
communicate to said BS an indication of said selected subset of said set of beamformed DL-RSs and the CSI acquired for said selected subset of said set of beamformed DL-RSs;
wherein the processor is configured to communicate said indication of said selected subset of said set of beamformed DL-RSs by communicating a selected subset indication value (SSIV) derived from a number of contiguous DL-RSs forming the selected subset and an identity of a DL-RS at a starting edge of the contiguous subset with respect to an antenna port number.

13. A method of channel state information (CSI) acquisition in a multiple input/multiple output (MIMO) communication system, comprising the steps at a base station (BS) of:
sending a set of beamformed downlink (DL) reference signals (DL-RSs) to a user equipment (UE); and
receiving from said UE an indication of a subset of said set of beamformed DL-RSs and CSI acquired by said UE for only said subset of said set of beamformed DL-RSs;
wherein the step of receiving at said BS an indication of said selected subset of said set of beamformed DL-RSs comprises receiving a selected subset indication value (SSIV) derived from a number of contiguous DL-RSs forming the selected subset and an identity of a DL-RS at a starting edge of the contiguous subset with respect to an antenna port number.

14. The method of claim 13, wherein the MIMO communication system is any of a massive MIMO communication system, a large-scale antenna communication system, a very large MIMO communication system, a hyper MIMO communication system, or a full-dimension (FD) MIMO communication system.

15. The method of claim 13, further comprising the step of, prior to the step of sending a set of beamformed DL-RSs to the UE, determining the set of beamformed DL-RSs which are to be sent to the UE.

16. The method of claim 13, wherein at the least the BS has a massive number of antennas number 100 or more.

17. The method of claim 13, wherein the BS transmits payload data to the UE based on the CSI received by the BS from the UE for said selected subset of said set of beamformed DL-RSs.

18. The method of claim 13, wherein the SSIV is given by the equation:

$$SSIV = \begin{cases} N_{beam}(L-1) + B_{start}, & \text{if } L-1 \leq \lfloor N_{beam}/2 \rfloor \\ N_{beam}(N_{beam}+1-L) + (N_{beam}-1-B_{start}) & \text{else} \end{cases}$$

where $N_{beam}$ is the number of DL-RSs in the set of beamformed DL-RSs transmitted to the UE from the BS;
L=the length of contiguous selected beams; and
$B_{start}$ is an antenna port number of a starting DL-RS in the contiguous DL-RSs forming the selected subset.

19. The method of claim 13, wherein the step of receiving at said BS CSI for only said selected subset of said set of beamformed DL-RSs further comprises receiving at least one of a Rank Indicator (RI) or a Channel Quality Indicator (CQI).

20. The method of claim 13, wherein the set of beamformed DL-RSs transmitted from the BS to the UE comprise beamformed CSI-RSs.

21. A base station (BS) for a multiple input/multiple output (MIMO) communication system, said BS comprising:
a memory; and
a processor connected to the memory configured to:
send a set of beamformed downlink (DL) reference signals (DL-RSs) to a user equipment (UE); and
receive from said UE an indication of a subset of said set of beamformed DL-RSs and CSI acquired by said UE for only said subset of said set of beamformed DL-RSs;
wherein the processor is configured to receive at said BS an indication of said selected subset of said set of beamformed DL-RSs by receiving a selected subset indication value (SSIV) derived from a number of contiguous DL-RSs forming the selected subset and an identity of a DL-RS at a starting edge of the contiguous subset with respect to an antenna port number.

22. A method of channel state information (CSI) acquisition in a multiple input/multiple output (MIMO) communication system, comprising the steps at a user equipment (UE) of:
receiving from a base station (BS) a set of beamformed downlink (DL) reference signals (DL-RSs);
selecting a subset of said set of beamformed DL-RSs;
acquiring CSI for only said selected subset of said set of beamformed DL-RSs; and
communicating to said BS an indication of said selected subset of said set of beamformed DL-RSs and the CSI acquired for said selected subset of said set of beamformed DL-RSs;
wherein the step of acquiring CSI for only said selected subset of said set of beamformed DL-RSs comprises finding a precoding matrix indicator (PMI) from a codebook with each codeword comprising M elements of the codeword in the codebook for all DL-RSs for each layer, where M is the cardinality of the selected subset of DL-RSs.

23. The method of claim 22, wherein the codewords for the selected subset of DL-RSs is normalized.

24. A user equipment (UE) for a multiple input/multiple output (MIMO) communication system, said UE comprising:
a memory; and
a processor connected to the memory configured to:
receive from a base station (BS) a set of beamformed downlink (DL) reference signals (DL-RSs);
estimate a channel of each DL-RS comprising said set of beamformed DL-RSs;
select a subset of said set of beamformed DL-RSs;
acquire CSI for only said selected subset of said set of beamformed DL-RSs; and
communicate to said BS an indication of said selected subset of said set of beamformed DL-RSs and the CSI acquired for said selected subset of said set of beamformed DL-RSs;
wherein the processor is configured to acquire CSI for only said selected subset of said set of beamformed DL-RSs by finding a precoding matrix indicator (PMI) from a codebook with each codeword comprising M elements of the codeword in the codebook for all DL-RSs for each layer, where M is the cardinality of the selected subset of DL-RSs.

25. A method of channel state information (CSI) acquisition in a multiple input/multiple output (MIMO) communication system, comprising the steps at a base station (BS) of:
   sending a set of beamformed downlink (DL) reference signals (DL-RSs) to a user equipment (UE); and
   receiving from said UE an indication of a subset of said set of beamformed DL-RSs and CSI acquired by said UE for only said subset of said set of beamformed DL-RSs;
   wherein the step of receiving at said BS the CSI acquired for said selected subset of said set of beamformed DL-RSs comprises receiving a precoding matrix indicator (PMI) from a codebook with each codeword comprising M elements of the codeword in the codebook for all DL-RSs for each layer, where M is the cardinality of the selected subset of DL-RSs.

26. A base station (BS) for a multiple input/multiple output (MIMO) communication system, said BS comprising:
   a memory; and
   a processor connected to the memory configured to:
   send a set of beamformed downlink (DL) reference signals (DL-RSs) to a user equipment (UE); and
   receive from said UE an indication of a subset of said set of beamformed DL-RSs and CSI acquired by said UE for only said subset of said set of beamformed DL-RSs;
   wherein the processor is configured to receive at said BS the CSI acquired for said selected subset of said set of beamformed DL-RSs by receiving a precoding matrix indicator (PMI) from a codebook with each codeword comprising M elements of the codeword in the codebook for all DL-RSs for each layer, where M is the cardinality of the selected subset of DL-RSs.

27. The method of claim 26, wherein the codewords for the selected subset of DL-RSs is normalized.

* * * * *